US011300721B2

(12) United States Patent
Frankiewicz et al.

(10) Patent No.: US 11,300,721 B2
(45) Date of Patent: Apr. 12, 2022

(54) LIGHTING APPARATUS HAVING AN OBLONG OPTIC CORRESPONDING TO MULTIPLE LIGHT SOURCES

(71) Applicant: ABL IP Holding LLC, Atlanta, GA (US)

(72) Inventors: Gregory Philip Frankiewicz, Elmhurst, IL (US); John Glenn Serra, Pingree Grove, IL (US)

(73) Assignee: ABL IP HOLDING LLC, Atlanta, GA (US)

( * ) Notice: Subject to any disclaimer, the term of this patent is extended or adjusted under 35 U.S.C. 154(b) by 0 days.

(21) Appl. No.: 16/925,807

(22) Filed: Jul. 10, 2020

(65) Prior Publication Data
US 2022/0011492 A1    Jan. 13, 2022

(51) Int. Cl.
| F21V 8/00 | (2006.01) |
| F21S 2/00 | (2016.01) |
| F21Y 115/30 | (2016.01) |
| F21Y 113/13 | (2016.01) |
| F21Y 103/10 | (2016.01) |

(52) U.S. Cl.
CPC ............ G02B 6/0001 (2013.01); F21S 2/005 (2013.01); F21Y 2103/10 (2016.08); F21Y 2113/13 (2016.08); F21Y 2115/30 (2016.08)

(58) Field of Classification Search
None
See application file for complete search history.

(56) References Cited

U.S. PATENT DOCUMENTS

| 1,422,480 A * | 7/1922 | Rutherford .............. B60Q 1/56 40/205 |
| 7,080,921 B2 | 7/2006 | Feldstein |
| 7,237,924 B2 | 7/2007 | Martineau et al. |
| 7,286,296 B2 | 10/2007 | Chaves et al. |
| 7,832,878 B2 | 11/2010 | Brukilacchio et al. |
| 7,918,583 B2 | 4/2011 | Chakmakjian et al. |
| 8,215,802 B2 | 7/2012 | Bailey |
| 8,231,250 B2 | 7/2012 | Bailey |
| 8,348,488 B2 | 1/2013 | Buelow, II et al. |
| 8,430,536 B1 | 4/2013 | Zhao |
| 8,641,231 B2 | 2/2014 | Ariyoshi et al. |
| 8,657,476 B2 | 2/2014 | Buelow et al. |

(Continued)

OTHER PUBLICATIONS

U.S. Appl. No. 17/079,764, Non-Final Office Action, dated Mar. 3, 2021, 19 pages.

(Continued)

*Primary Examiner* — Vip Patel
(74) *Attorney, Agent, or Firm* — Kilpatrick Townsend & Stockton LLP

(57) ABSTRACT

Disclosed herein are lighting apparatuses that have an oblong optic that corresponds to a plurality of light sources. According to certain embodiments, a lighting apparatus includes a plurality of light sources that are arranged along a linear direction, and an optic that is configured to receive light from each light source of the plurality of light sources. The optic has an oblong shape with a long axis that is parallel to the linear direction, and the optic is configured to emit an output light beam that is substantially rotationally symmetric in a plane that is orthogonal to an emission direction of the plurality of light sources.

17 Claims, 13 Drawing Sheets

(56) References Cited

U.S. PATENT DOCUMENTS

| | | |
|---|---|---|
| 8,710,754 B2 | 4/2014 | Baddela et al. |
| 8,870,410 B2 | 10/2014 | Auyeung |
| 8,870,617 B2 | 10/2014 | Harbers |
| 9,801,250 B1 | 10/2017 | Halliwell |
| 9,801,259 B2 | 10/2017 | Rasmussen |
| 10,302,278 B2 | 5/2019 | Lim et al. |
| 2006/0139953 A1 | 6/2006 | Chou et al. |
| 2009/0168414 A1 | 7/2009 | Bailey |
| 2010/0165623 A1 | 7/2010 | Bremerich et al. |
| 2011/0182065 A1 | 7/2011 | Negley et al. |
| 2013/0153934 A1 | 6/2013 | Meitl et al. |
| 2015/0054005 A1 | 2/2015 | Kim et al. |
| 2015/0117000 A1 | 4/2015 | Luo et al. |
| 2016/0312979 A1 | 10/2016 | Ebner |
| 2017/0059120 A1 | 3/2017 | Kataoka |
| 2018/0192484 A1 | 7/2018 | Stopa et al. |
| 2018/0313519 A1 | 11/2018 | Lacroix |
| 2019/0171010 A1 | 6/2019 | Nambara |
| 2019/0383465 A1 | 12/2019 | Van Der Sijde et al. |

OTHER PUBLICATIONS

U.S. Appl. No. 17/079,764, Final Office Action, dated Sep. 1, 2021, 23 pages.

\* cited by examiner

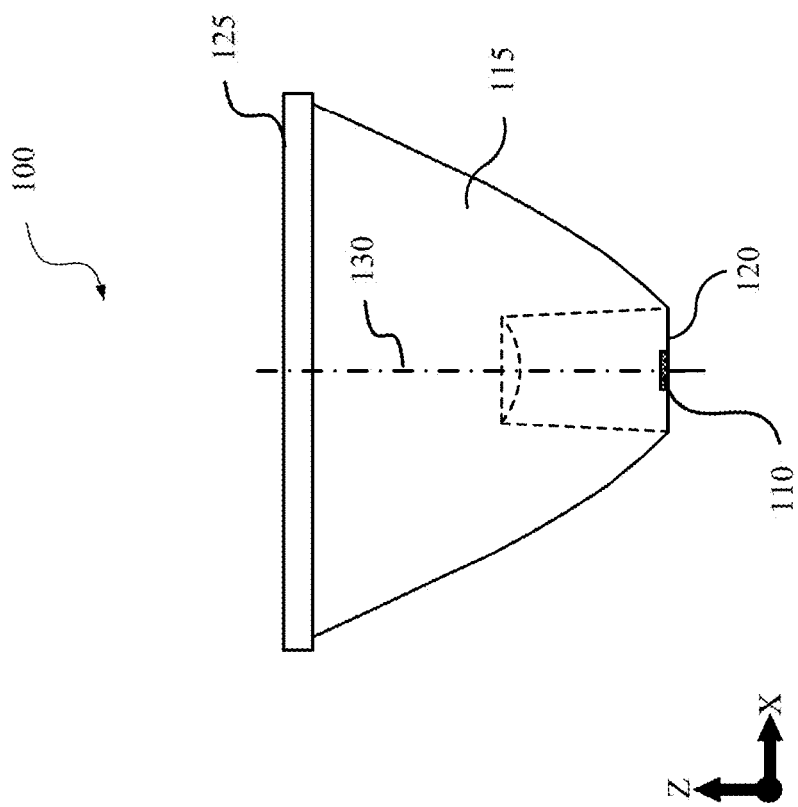
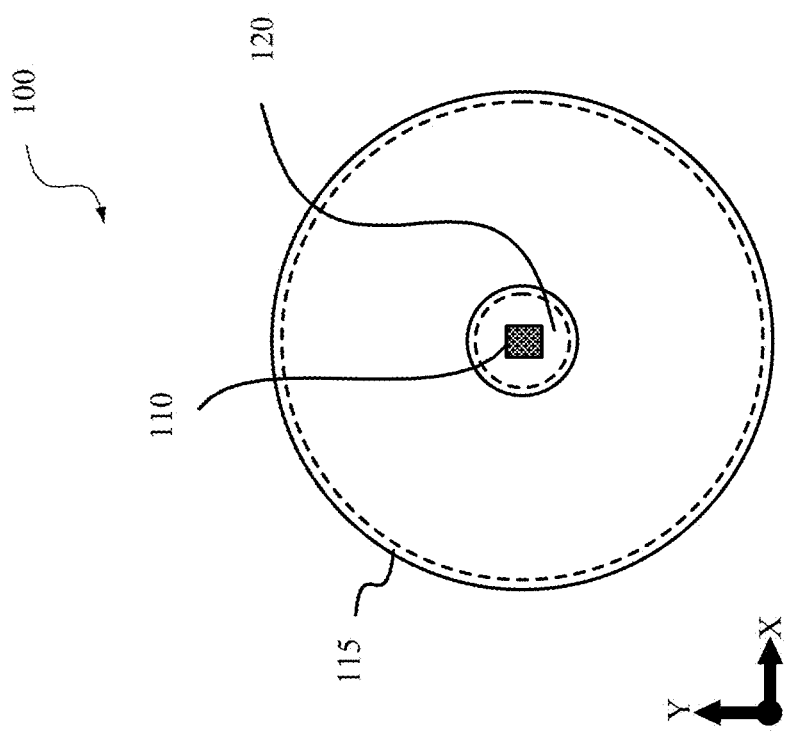

LIGHTING APPARATUS HAVING AN OBLONG OPTIC CORRESPONDING TO MULTIPLE LIGHT SOURCES

FIELD

Embodiments of the present invention relate to lighting apparatuses for producing various light distributions.

BACKGROUND

Related art lighting apparatuses that generate white light are designed to produce a rotationally symmetric light distribution having a single correlated color temperature (CCT). These related art lighting apparatuses generally use a rotationally symmetric optic to collect and distribute the light from a rotationally symmetric light source. However, it may be advantageous to provide white light tuning, in which the CCT of the output beam from the lighting apparatus can be adjusted. For example, a checkerboard pattern of light sources having different CCTs, such as a 2×2, 3×3, or 4×4 pattern of light sources, may be used with a rotationally symmetric optic to try to create a rotationally symmetric light distribution. However, this results in an increase in the size of the optic that is used to collect the light from the light sources, and the resulting light distribution may appear as a checkerboard pattern. On the other hand, if only one color is turned on at a time to achieve a more uniform light distribution, the amount of output light is reduced by a factor of two.

SUMMARY

This disclosure relates generally to lighting apparatuses that have an oblong optic that corresponds to a plurality of light sources. According to some embodiments, a lighting apparatus includes a plurality of light sources that are arranged along a linear direction and an optic that is configured to receive light from each light source of the plurality of light sources. The optic has an oblong shape with a long axis that is parallel to the linear direction, and the optic is configured to emit an output light beam that is substantially rotationally symmetric in a plane that is orthogonal to an emission direction of the plurality of light sources.

The optic may be a total internal reflector (TIR). The plurality of light sources may include a first light source having a first CCT between 1800 K and 3500 K, and a second light source having a second CCT between 4500 and 7000 K. The first CCT may be 2700 K and the second CCT may be 5000 K.

A center of the optic may be aligned with an axis that runs between the first light source and the second light source. The lighting apparatus may also include a texture that is arranged to receive light from a light emitting surface of the optic. The texture may include a molded structure and/or an optical pattern.

The output light beam may have a first full-width at half-maximum (FWHM) along the linear direction and a second FWHM along a lateral direction that is orthogonal to the linear direction and to the emission direction of the plurality of light sources. The first FWHM may be within ±10% of the second FWHM. Each light source of the plurality of light sources may have a geometry that is rotationally symmetric within a plane including the linear direction and a lateral direction that is orthogonal to the linear direction and to the emission direction of the plurality of light sources.

According to some embodiments, a lighting apparatus includes a first light fixture and a second light fixture. The first light fixture includes a first light source having a first CCT and a second light source having a second CCT. The second CCT is different from the first CCT. The first light fixture also includes a first optic that is configured to receive first light from the first light source and the second light source and to emit a first output beam. The first optic has a first oblong shape with a first long axis that is parallel to a linear direction. The second light fixture includes a third light source having the first CCT, a fourth light source having the second CCT, and a second optic that is configured to receive second light from the third light source and the fourth light source and to emit a second output beam. The second optic has a second oblong shape with a second long axis that is parallel to the linear direction. The first light source, the second light source, the fourth light source, and the third light source are arranged in order along the linear direction.

The first optic and the second optic may be configured such that the first output beam and the second output beam combine to form an output light beam that is substantially rotationally symmetric in a plane that is orthogonal to an emission direction of the first light source, the second light source, the third light source, and the fourth light source. The output light beam may have a first FWHM along the linear direction and a second FWHM along a lateral direction that is orthogonal to the linear direction and to the emission direction of the first light source, the second light source, the third light source, and the fourth light source. The first FWHM may be within ±10% of the second FWHM.

The first optic may be a first TIR and the second optic may be a second TIR. The first CCT may be between 1800 K and 3500 K, and the second CCT may be between 4500 and 7000 K. The first CCT may be 2700 K and the second CCT may be 5000 K.

A first center of the first optic may be aligned with a first axis that runs between the first light source and the second light source, and a second center of the second optic may be aligned with a second axis that runs between the third light source and the fourth light source. Each of the first light source, the second light source, the third light source, and the fourth light source may have a geometry that is rotationally symmetric within a plane comprising the linear direction and a lateral direction that is orthogonal to the linear direction and to an emission direction of the first light source, the second light source, the third light source, and the fourth light source.

The lighting apparatus may also include a first texture that is arranged to receive light from a first light emitting surface of the first optic and a second texture that is arranged to receive light from a second light emitting surface of the second optic. The first texture may include a first molded structure and/or a first optical pattern, and the second texture may include a second molded structure and/or a second optical pattern.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

Illustrative embodiments are described in detail below with reference to the following figures.

FIGS. 1A and 1B are schematic diagrams of an example of a prior art lighting apparatus that emits white light having a single CCT.

Figure 2B:
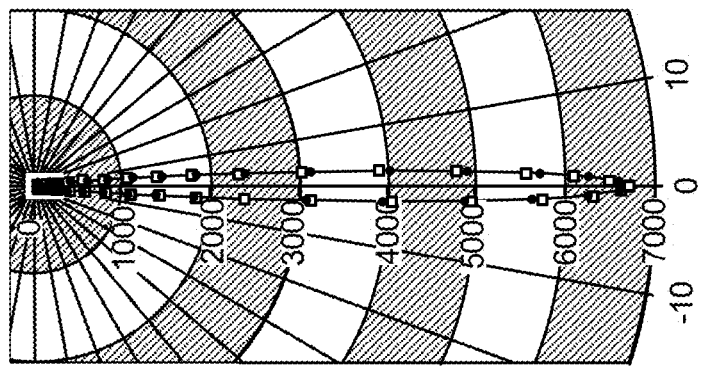
FIGS. 2A and 2B are graphs illustrating simulations of a light distribution from the prior art lighting apparatus shown in FIGS. 1A and 1B.

The figures depict embodiments of the present disclosure for purposes of illustration only. One skilled in the art will readily recognize from the following description that alternative embodiments of the structures and methods illustrated may be employed without departing from the principles, or benefits touted, of this disclosure.

DETAILED DESCRIPTION

FIGS. 1A and 1B are schematic diagrams of an example of a prior art lighting apparatus 100 that emits white light having a single correlated color temperature (CCT). FIG. 1A shows a top view of the prior art lighting apparatus 100, and FIG. 1B shows a side view of the prior art lighting apparatus 100. As shown in FIGS. 1A and 1B, the prior art lighting apparatus 100 includes a light source 110 and an optic 115. The light source 110 may be a light emitting diode (LED) that is rotationally symmetric within the X-Y plane. For example, the LED may have a square shape. The optic 115 may be a total internal reflector (TIR) that is also rotationally symmetric within the X-Y plane. The optic 115 may have a base portion 120 and a light emitting surface 125. Both the light source 110 and the optic 115 may be centered on an optical axis 130. The light source 110 may emit light in a direction that is parallel to the optical axis 130. The light source 110 may be positioned at the focal point of the base portion 120. In this example, the CCT of the light source 110 is 3000 K.

Figure 2A:
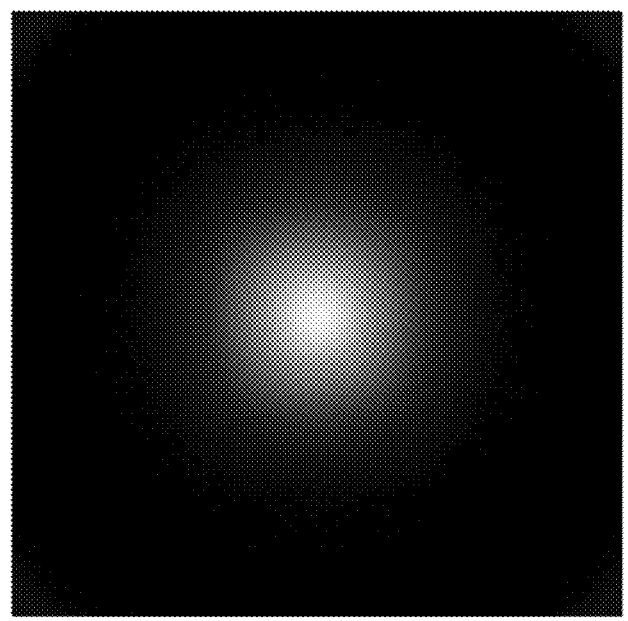

FIGS. 2A and 2B are graphs illustrating simulations of a light distribution from the prior art lighting apparatus 100. FIG. 2A shows a simulated true color plot 200 of the light distribution from the prior art lighting apparatus 100 on an 8' by 8' floor from a height of 10', and FIG. 2B shows a simulated polar intensity plot 205 of the light distribution from the prior art lighting apparatus 100. As shown in FIGS. 2A and 2B, the prior art lighting apparatus 100 provides a tight light distribution that is rotationally symmetric within the X-Y plane. In this example, the light distribution has a full-width at half-maximum (FWHM) of 5.7° in both the X direction and the Y direction.

Figure 3:
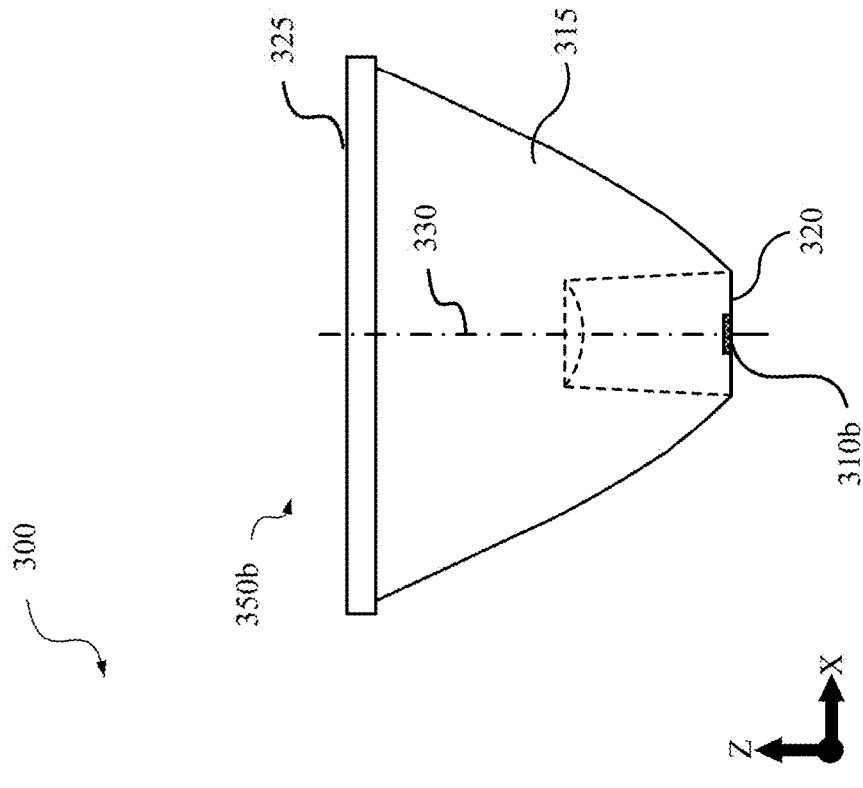
FIG. 3 is a schematic diagram of an example of a lighting apparatus that may be used for white light tuning.

FIG. 3 is a schematic diagram of an example of a lighting fixture 300 that may be used for white light tuning. In lighting fixture 300, each of a plurality of light sources is provided with a corresponding rotationally symmetric optic. FIG. 3 shows a side view of the lighting fixture 300. As shown in FIG. 3, the lighting fixture 300 includes a first lighting fixture 350a and a second lighting fixture 350b, each of which may have the same design as the prior art lighting apparatus 100 discussed above with reference to FIGS. 1A and 1B. Although only two lighting fixtures 350a and 350b are shown, any suitable number of lighting fixtures may be provided. The first lighting fixture 350a includes a first light source 310a that has a first CCT, while the second lighting fixture 350b includes a second light source 310b that has a second CCT. In this example, the CCT of the first light source 310a is 3000 K and the CCT of the second light source 310b is 6500 K. More generally, the first light source 310a may have a warmer hue that has a yellow appearance, while the second light source 310b may have a cooler hue that has a blue appearance. Each of the light sources 310a and 310b may be an LED that is rotationally symmetric within the X-Y plane. Each of the first lighting fixture 350a and the second lighting fixture 350b also includes an optic 315 that may be a TIR that is also rotationally symmetric within the X-Y plane. The optic 315 may have a base portion 320 and a light emitting surface 325. The optic 315 may be centered on an optical axis 330. The light sources 310a and 310b may emit light in a direction that is parallel to the optical axis 330. Light from the first lighting fixture 350a and light from the second lighting fixture 350b overlaps in the far field. The CCT of the resulting beam may be varied by adjusting the intensity of the first light source 310a and/or the second light source 310b. In an extreme case, one of the light sources 310a or 310b may be turned off, such that the resulting beam has the CCT of the other one of the light sources 310a or 310b that is turned on.

Figure 4B:
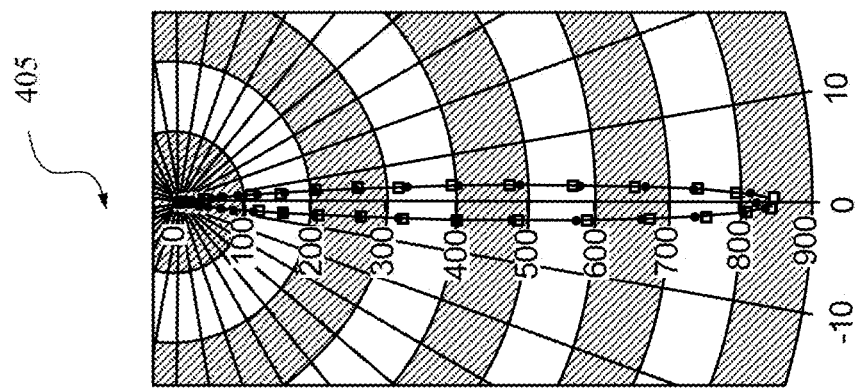
FIGS. 4A and 4B are graphs illustrating simulations of a light distribution from the lighting apparatus shown in FIG. 3.
Figure 4A:
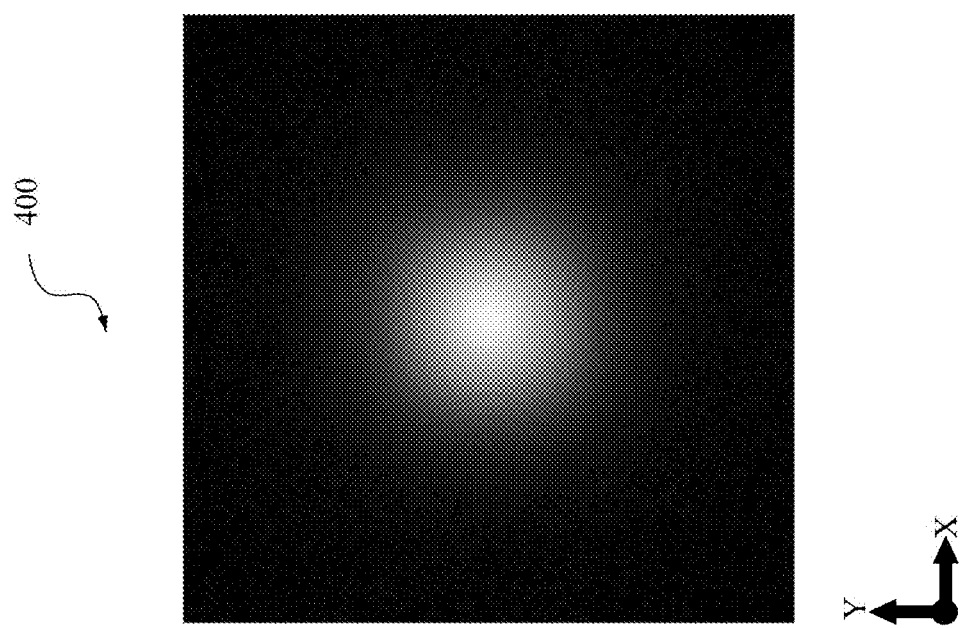

FIGS. 4A and 4B are graphs illustrating simulations of a light distribution from the lighting apparatus 300. FIG. 4A shows a simulated true color plot 400 of the light distribution from the lighting apparatus 300 on an 8' by 8' floor from a height of 10', and FIG. 4B shows a simulated polar intensity plot 405 of the light distribution from the lighting apparatus 300. In this example, the first light source 310a and the second light source 310b may provide equal light intensities. As shown in FIGS. 4A and 4B, the lighting apparatus 300 provides a tight light distribution that is rotationally symmetric within the X-Y plane. In this example, the light distribution has a full-width at half-maximum (FWHM) of 6.8° in both the X direction and the Y direction. However, there is some color bias within the light distribution, such that the left side is warmer and the right side is cooler. In addition, the optics 315 within the different lighting apparatuses 350a and 350b appear different in the near field. Further, if only one of the light sources 310a or 310b is turned on, only half of the light is generated as compared with the same number of prior art lighting apparatuses 100.

Figure 5B:
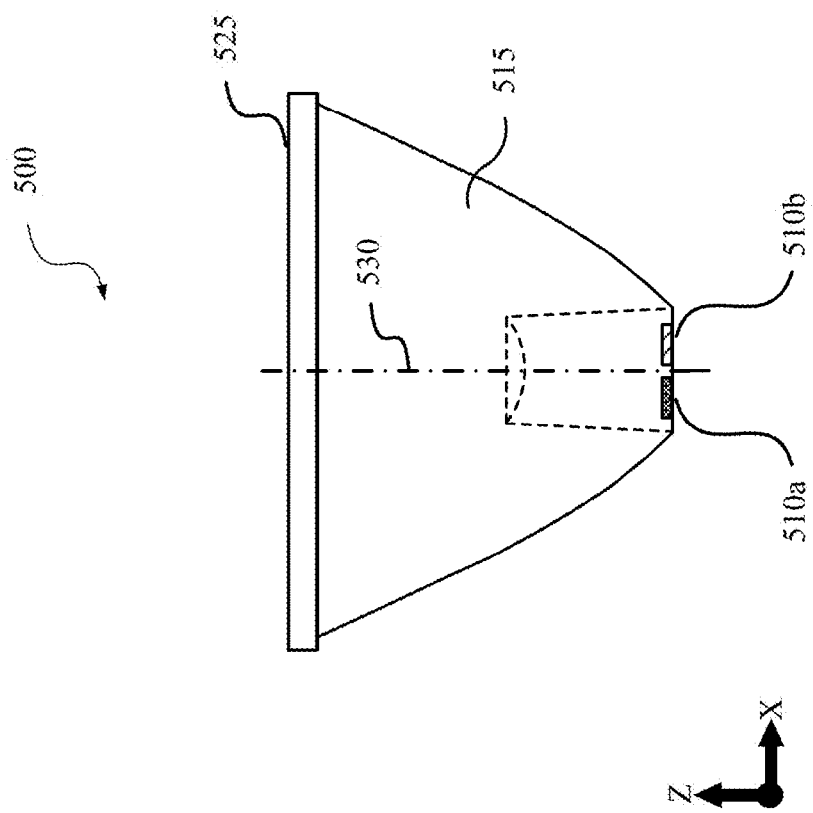
FIGS. 5A and 5B are schematic diagrams of an example of another lighting apparatus that may be used for white light tuning.
Figure 5A:
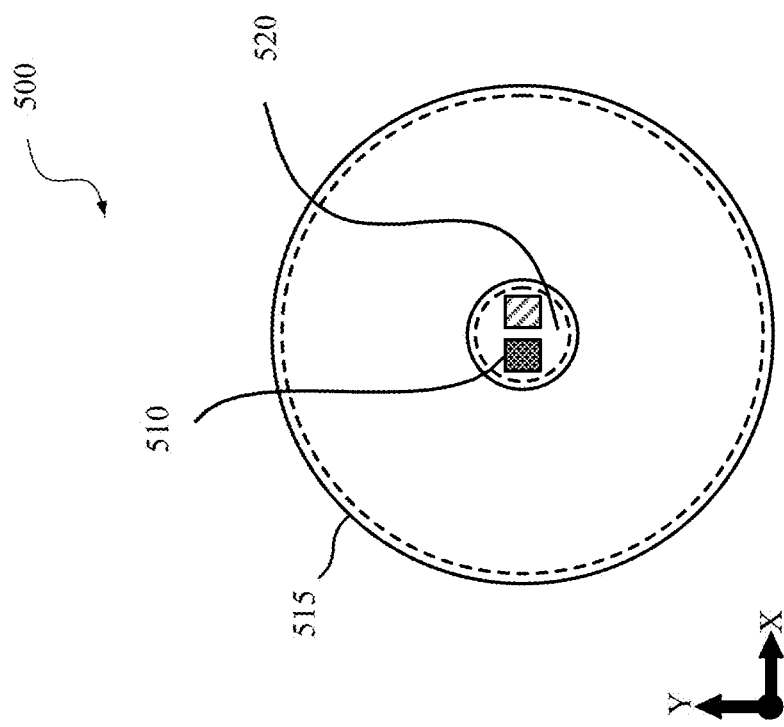

FIGS. 5A and 5B are schematic diagrams of an example of another lighting apparatus 500 that may be used for white light tuning. In lighting apparatus 500, two light sources share a corresponding rotationally symmetric optic. FIG. 5A shows a top view of the lighting apparatus 500, and FIG. 5B shows a side view of the lighting apparatus 500. As shown in FIGS. 5A and 5B, the lighting apparatus 500 includes a first light source 510a and a second light source 510b, as well as an optic 515. Each of the light sources 510a and 510b may be an LED that is rotationally symmetric within the X-Y plane. However, the combination of the light sources 510a and 510b is not rotationally symmetric, because the light emitting area is greater in the X direction than the Y direction. Alternatively, a single light source (not shown) having a rectangular shape may be used instead of the light sources 510a and 510b. The single light source may have a dimension along the X axis that is longer than a dimension along the Y axis. Alternatively, a different number of light sources may be used.

The optic 515 may be a TIR that is rotationally symmetric within the X-Y plane. The optic 515 may have a base portion 520 and a light emitting surface 525. The optic 515 may be centered on an optical axis 530. The light sources 510a and 510b may be arranged at equal distances on opposite sides of the optical axis 530. The light sources 510a and 510b may emit light in a direction that is parallel to the optical axis 530. The light sources 510a and 510b may emit light having different CCTs. In this example, the CCT of the first light source 510a is 3000 K and the CCT of the second light source 510b is 6500 K. Light from the first light source 510a and light from the second light source 510b is combined by the optic 515. The CCT of the resulting beam may be varied by adjusting the intensity of the first light source 510a and/or the second light source 510b. In an extreme case, one of the light sources 510a or 510b may be turned off, such that the resulting beam has the CCT of the other one of the light sources 510a or 510b that is turned on.

Figure 6B:
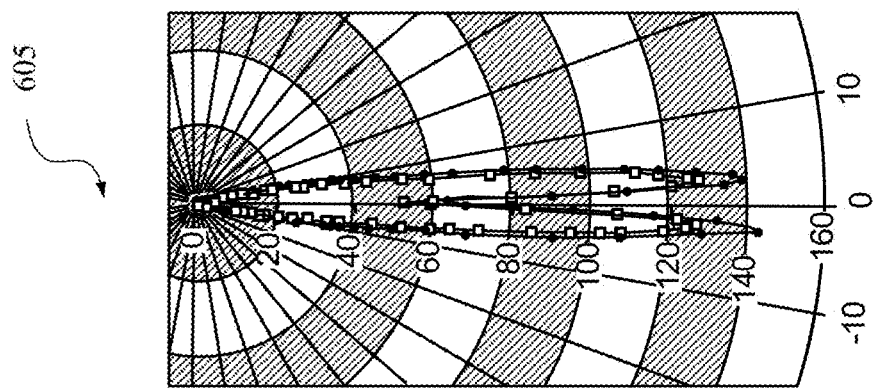
FIGS. 6A and 6B are graphs illustrating simulations of a light distribution from the lighting apparatus shown in FIGS. 5A and 5B.
Figure 6A:
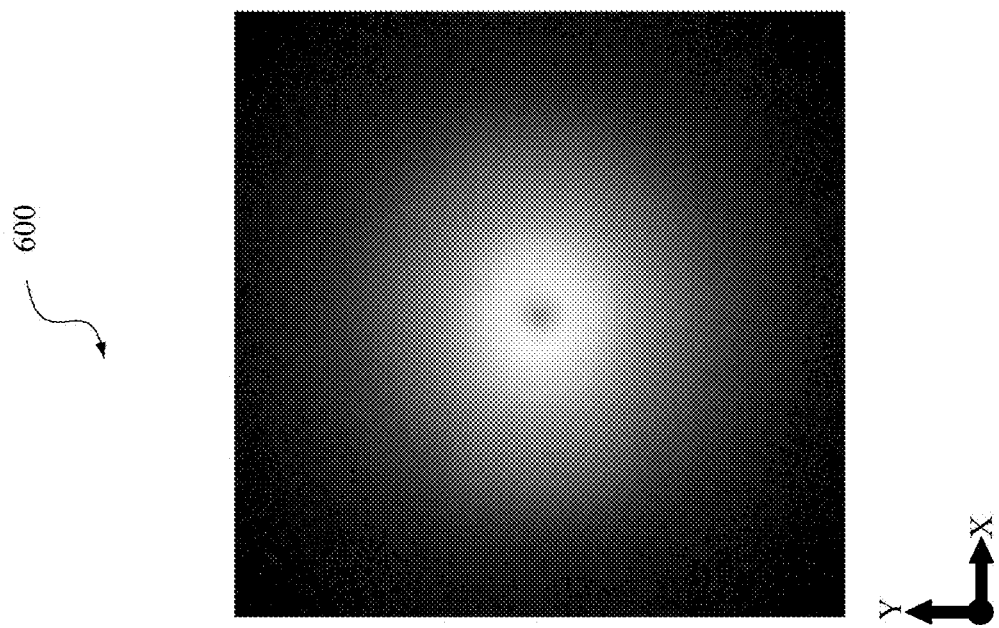

FIGS. 6A and 6B are graphs illustrating simulations of a light distribution from the lighting apparatus 500. FIG. 6A shows a simulated true color plot 600 of the light distribution from the lighting apparatus 500 on an 8' by 8' floor from a height of 10', and FIG. 6B shows a simulated polar intensity plot 605 of the light distribution from the lighting apparatus 500. In this example, the first light source 510a and the second light source 510b may provide equal light intensities. As shown in FIGS. 6A and 6B, the lighting apparatus 500 provides a light distribution that is no longer peaked in the center, creating a hole in the output beam. This is because the optic 515 is essentially focused on the gap between the first light source 510a and the second light source 510b. Further, the light distribution is wider than the previous examples, and has become asymmetric. Because the light emitting area has increased in the X direction, the etendue of the light emitting area has increased in the X direction while the etendue of the optic 515 remains the same, causing the light distribution to become wider in the X direction. In this example, the light distribution has a FWHM of 21.2° in the X direction and 17.6° in the Y direction. Further, there is more color bias within the light distribution, such that the left side is much warmer and the right side is much cooler. The beam quality may be improved somewhat by adding a texture to the light emitting surface 525 of the optic 515, but the improvement is insufficient to compensate for the issues discussed above.

Figure 7B:
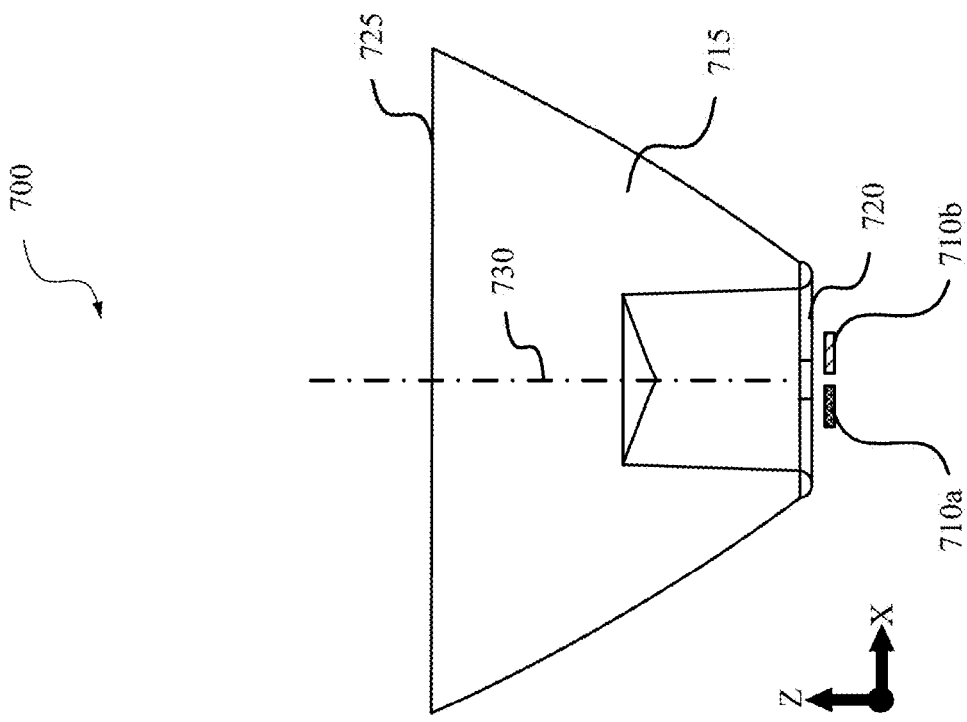
FIGS. 7A and 7B are schematic diagrams of an example of yet another lighting apparatus that may be used for white light tuning according to certain embodiments.
Figure 7A:
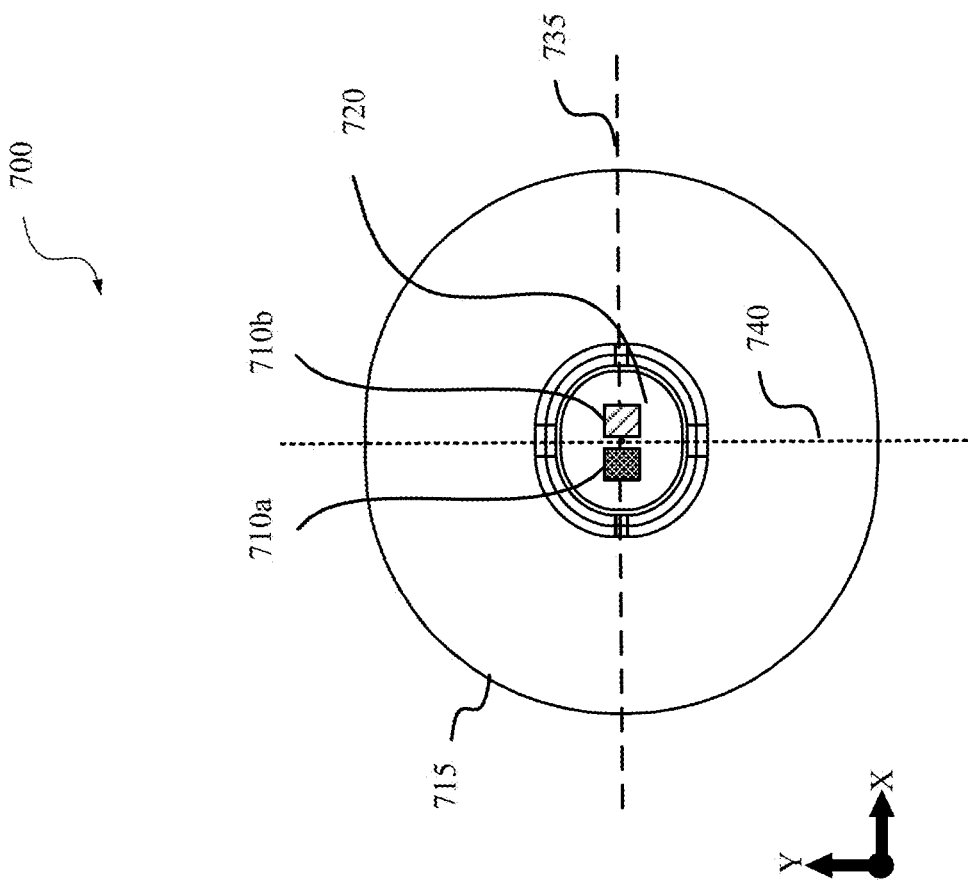

FIGS. 7A and 7B are schematic diagrams of an example of a lighting apparatus 700 that may be used for white light tuning according to certain embodiments. In the lighting apparatus 700, two light sources share a corresponding oblong optic. FIG. 7A shows a top view of the lighting apparatus 700, and FIG. 7B shows a side view of the lighting apparatus 700. As shown in FIGS. 7A and 7B, the lighting apparatus 700 includes a first light source 710a and a second light source 710b, as well as an optic 715. Each of the light sources 710a and 710b may be an LED that is rotationally symmetric within the X-Y plane. However, the combination of the light sources 710a and 710b is not rotationally symmetric, because the light emitting area is greater in the X direction than the Y direction. Accordingly, the optic 715 may be a TIR that has an oblong shape, such that a long axis of the optic 715 along a first axis 735 is longer than a short axis of the optic 715 along a second axis 740. The first axis 735 may be parallel to the X direction, while the second axis 740 may be parallel to the Y direction. The optic 715 may have a base portion 720 and a light emitting surface 725. The optic 715 may be centered on an optical axis 730. The light sources 710a and 710b may be arranged at equal distances on opposite sides of the optical axis 730. The light sources 710a and 710b may emit light in a direction that is parallel to the optical axis 730. Although only two light sources 710a and 710b are shown, any suitable number of light sources may be provided.

The light sources 710a and 710b may emit light having different CCTs. In this example, the CCT of the first light source 710a is 3000 K and the CCT of the second light source 710b is 6500 K. In other examples, the CCT of the first light source 710a may be 2700 K and the CCT of the second light source 710b may be 5000 K. More generally, the first light source 310a may have a warmer hue that has a yellow appearance, while the second light source 310b may have a cooler hue that has a blue appearance. For example, the first light source 310a may have a CCT between 1800 K and 3500 K, and the second light source 310b may have a CCT between 4500 K and 7000 K. Light from the first light source 710a and light from the second light source 710b is combined by the optic 715. The CCT of the resulting beam may be varied by adjusting the intensity of the first light source 710a and/or the second light source 710b. In an extreme case, one of the light sources 710a or 710b may be turned off, such that the resulting beam has the CCT of the other one of the light sources 710a or 710b that is turned on.

The lengths of the long axis and the short axis of the optic 715, along with the shape of the optic 715, may be designed to produce a substantially rotationally symmetric light distribution. For example, the principle of etendue may be used to select the dimensions of the optic 715. According to the principle of etendue, the product of the area of the light source and the angle of the light from the light source is a constant throughout the system. Therefore, increasing the length of the optic 715 in one dimension results in a corresponding decrease in the angle of the light in that direction. The shapes of the various surfaces within the optic 715 may also be adjusted to maintain the total internal reflection of the light. Because the light sources 710a and 710b are offset from the center of the optic 715, the optic 715 attempts to image the light sources 710a and 710b in the far field, but near the center of the optic 715 the image of each light source 710a and 710b is pushed to the other side. This has the effect of smearing the CCT from each light source 710*a* and 710*b* through the output beam generated by the optic 715, thereby improving color mixing of the two CCTs. More generally, the output dimensions of the optic 715 along the vertical and horizontal directions, along with the profile shape of the optic 715, may be selected to adjust the characteristics of the light distribution. For example, a cross-section of the outer surface of the optic 715 may have various shapes, such as a straight line, a polynomial shape, a parabolic shape, a semi-parabolic shape, or a simple spline. Different portions of the cross-section of the outer surface of the optic 715 may have different shapes and/or may include faceted surfaces.

Figure 8B:
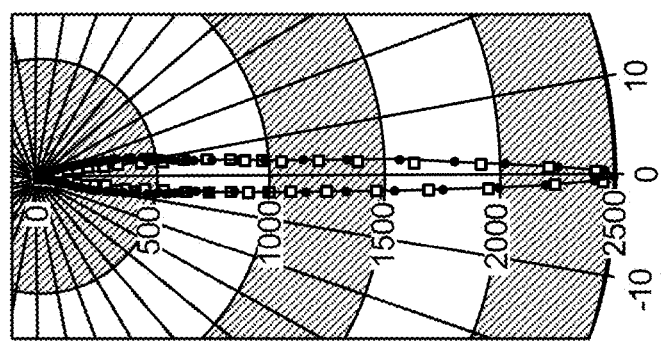
FIGS. 8A and 8B are graphs illustrating simulations of a light distribution from the lighting apparatus shown in FIGS. 7A and 7B.
Figure 8A:
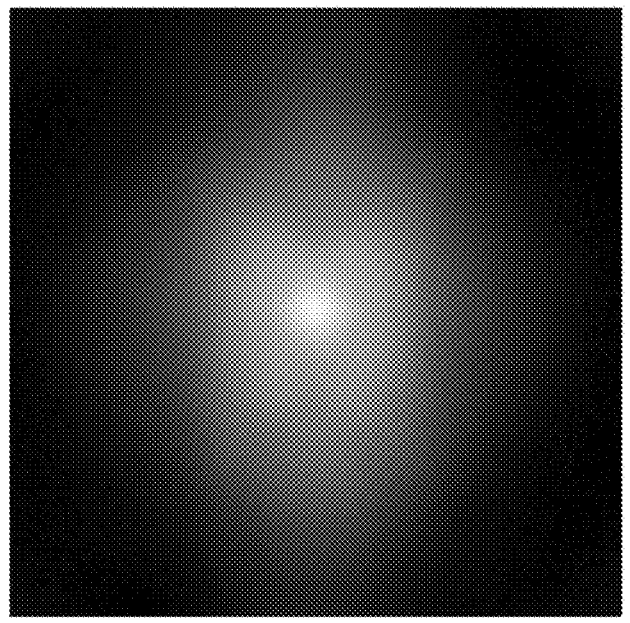

FIGS. 8A and 8B are graphs illustrating simulations of a light distribution from the lighting apparatus 700. FIG. 8A shows a simulated true color plot 800 of the light distribution from the lighting apparatus 700 on an 8' by 8' floor from a height of 10', and FIG. 8B shows a simulated polar intensity plot 805 of the light distribution from the lighting apparatus 700. In this example, the first light source 710*a* and the second light source 710*b* may provide equal light intensities. As shown in FIGS. 8A and 8B, the lighting apparatus 700 provides a light distribution that has a peak in the center and is substantially rotationally symmetric. In this example, the light distribution has a FWHM of 6.5° in the X direction and 5.9° in the Y direction. A light distribution that is substantially rotationally symmetric may have a FWHM in a first direction that is within ±5%, ±10%, ±15%, ±20%, or ±25% of the FWHM in a second direction that is orthogonal to the first direction within a plane that is orthogonal to the optical axis 730 (e.g., the X-Y plane). There are some areas of warmer and cooler light within the light distribution. However, the warmer light extends into the side dominated by the cooler light, and the cooler light extends into the side dominated by the warmer light. This enables further light mixing to generate a light distribution with a more uniform color, as discussed in further detail below.

Figure 9B:
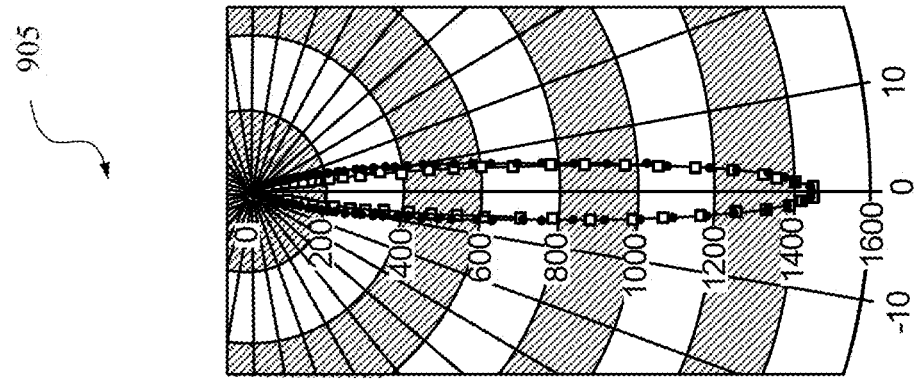
FIGS. 9A and 9B are graphs illustrating simulations of a light distribution from the lighting apparatus shown in FIGS. 7A and 7B with additional light mixing.
Figure 9A:
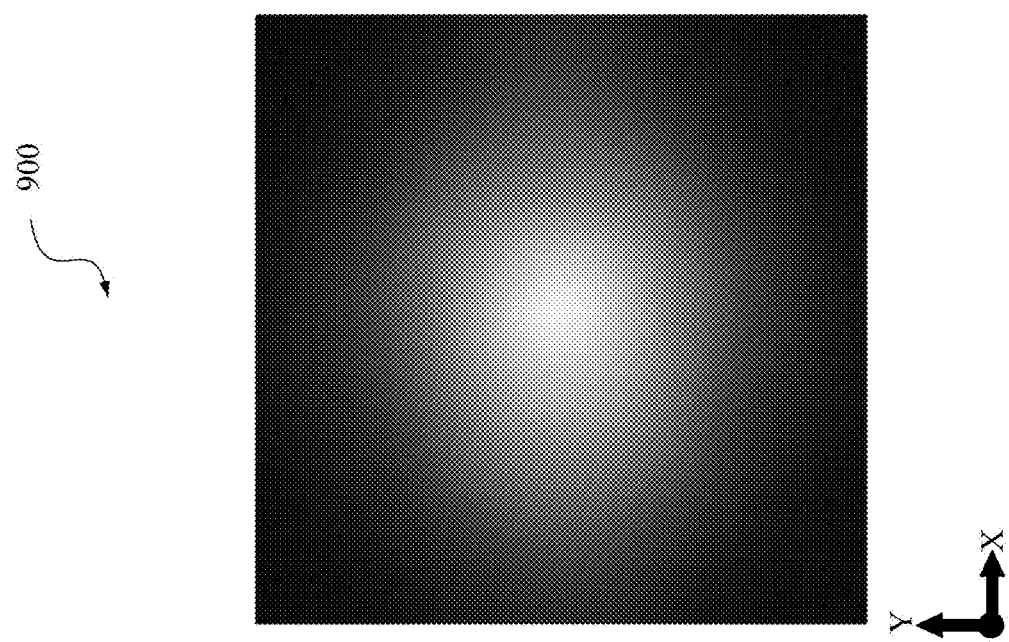

FIGS. 9A and 9B are graphs illustrating simulations of a light distribution from the lighting apparatus 700 with additional light mixing. Specifically, a texture is provided to receive light from the light emitting surface 725 of the optic 715 and may function as a diffuser of the light. For example, the texture may be a secondary optical component having a molded structure and/or an optical pattern that is arranged to receive light from the light emitting surface 725 of the optic 715. Alternatively or in addition, the texture may be incorporated within a film that is arranged on the light emitting surface 725 of the optic 715, and/or molded directly into the light emitting surface 725 of the optic 715. The amount of scattering may be adjusted by changing various properties of the texture, such as the number of scratches or the depth and width of optical elements within the texture. FIG. 9A shows a simulated true color plot 900 of the light distribution from the lighting apparatus 700 with the texture on an 8' by 8' floor from a height of 10', and FIG. 9B shows a simulated polar intensity plot 905 of the light distribution from the lighting apparatus 700 with the texture. In this example, the first light source 710*a* and the second light source 710*b* may provide equal light intensities. As shown in FIGS. 9A and 9B, the lighting apparatus 700 with the texture provides a light distribution that has a peak in the center and is substantially rotationally symmetric. In this example, the light distribution is wider, and has a FWHM of 11.6° in the X direction and 10.7° in the Y direction. Some areas of warmer and cooler light remain within the light distribution, but they are more evenly distributed, and the light distribution looks more similar to what is produced by the prior art lighting apparatus 100. Additional color mixing may be used to further improve the uniformity of the light distribution. For example, facets may be added to the reflective surface of the optic 715. Alternatively or in addition, various surfaces through which the light passes may be textured, such as the input interior of the optic 715.

Figure 10:
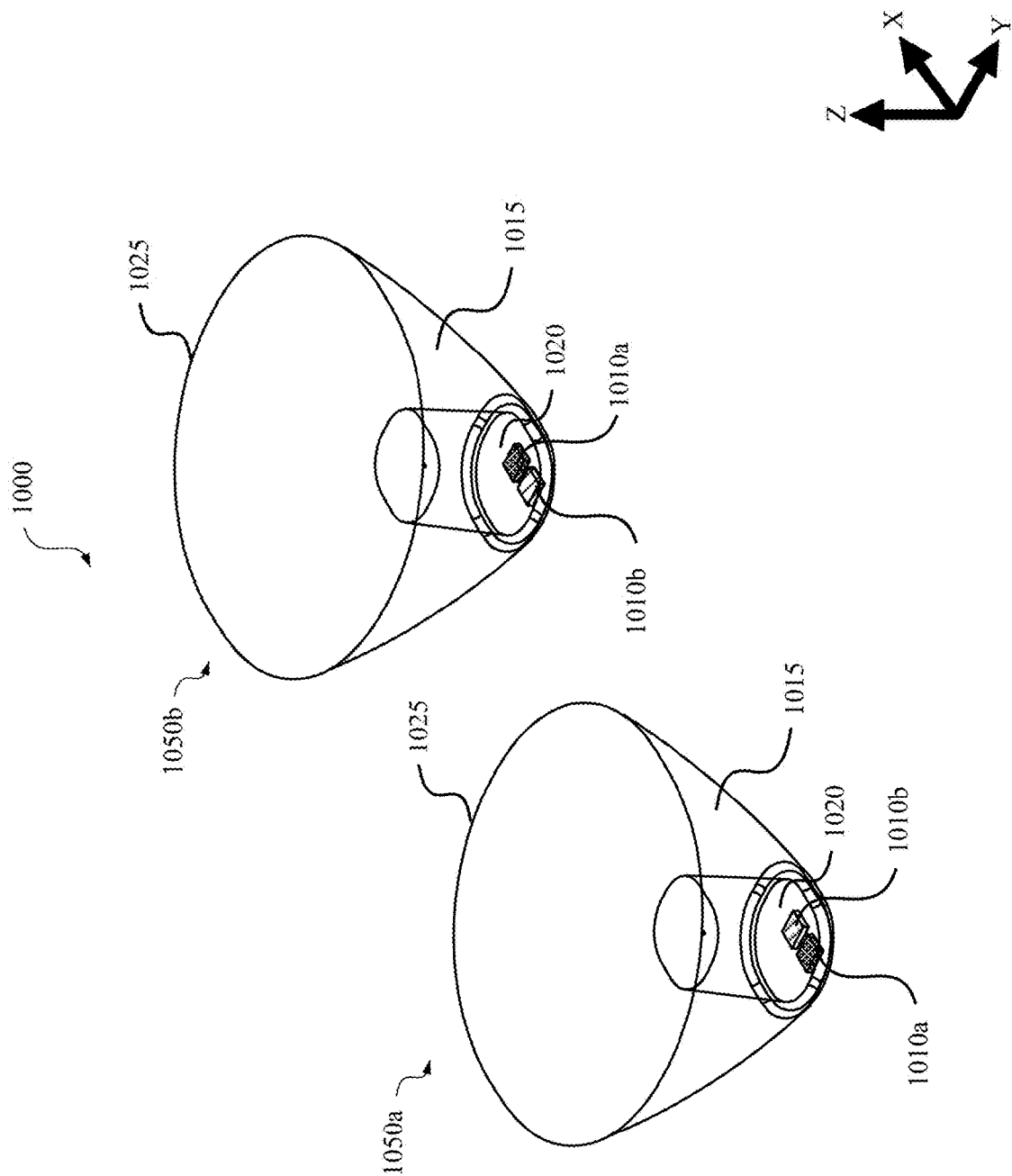
FIG. 10 is a schematic diagram of an example of still another lighting apparatus that includes a plurality of light fixtures and may be used for white light tuning according to certain embodiments.

FIG. 10 is a schematic diagram of an example of a lighting apparatus 1000 that includes a plurality of light fixtures and may be used for white light tuning according to certain embodiments. Each of the plurality of light fixtures may be an example of the lighting apparatus 700 discussed above with reference to FIGS. 7A and 7B. In particular, each of the plurality of light fixtures may include two light sources that share a corresponding oblong optic. FIG. 10 shows a perspective view of the lighting apparatus 1000. As shown in FIG. 10, the lighting apparatus 1000 includes a first light fixture 1050*a* and a second light fixture 1050*b*, each of which may have the same design as the lighting apparatus 700. Each of the first light fixture 1050*a* and the second light fixture 1050*b* includes a first light source 1010*a* that has a first CCT and a second light source 1010*b* that has a second CCT. In this example, the CCT of the first light source 1010*a* is 3000 K and the CCT of the second light source 1010*b* is 6500 K. In other examples, the CCT of the first light source 1010*a* may be 2700 K and the CCT of the second light source 1010*b* may be 5000 K. More generally, the first light source 1010*a* may have a warmer hue that has a yellow appearance, while the second light source 1010*b* may have a cooler hue that has a blue appearance. For example, the first light source 1010*a* may have a CCT between 1800 K and 3500 K, and the second light source 1010*b* may have a CCT between 4500 K and 7000 K. Each of the light sources 1010*a* and 1010*b* may be an LED that is rotationally symmetric within the X-Y plane. However, the combination of the light sources 1010*a* and 1010*b* is not rotationally symmetric, because the light emitting area is greater in the X direction than the Y direction.

Further, each of the light fixtures 1050*a* and 1050*b* includes an optic 1015 that has an oblong shape, such that a long axis of the optic 1015 along the X direction is longer than a short axis of the optic 1015 along the Y direction. The optic 1015 may have a base portion 1020 and a light emitting surface 1025. The optic 1015 may be centered on an optical axis (not shown) along the Z direction. Within each of the light fixtures 1050*a* and 1050*b*, the light sources 1010*a* and 1010*b* may be arranged at equal distances on opposite sides of the optical axis. The light sources 1010*a* and 1010*b* may emit light along the Z direction. Light from the first light fixture 1050*a* and light from the second light fixture 1050*b* overlaps in the far field. The CCT of the resulting beam may be varied by adjusting the intensity of the first light sources 1010*a* and/or the second light sources 1010*b*.

As shown in FIG. 10, the first light fixture 1050*a* and the second light fixture 1050*b* may be arranged along the X direction such that their components form a mirror reflection about the Y-Z plane. In particular, the first light fixture 1050*a* and the second light fixture 1050*b* may be arranged such that the second light source 1010*b* within the first light fixture 1050*a* is adjacent to the second light source 1010*b* within the second light fixture 1050*b*. As shown in FIG. 10, the light sources may be arranged in a line along the X axis in the following order: the first light source 1010*a* within the first light fixture 1050*a*, the second light source 1010*b* within the first light fixture 1050*a*, the second light source 1010*b* within the second light fixture 1050*b*, and the first light source 1010*a* within the second light fixture 1050*b*. This mirroring of the components of the first light fixture 1050*a* and the second light fixture 1050b creates output beams that are mirror images of each other. The overlap of the two output beams may result in a light distribution having improved uniformity as compared with a single one of the individual light fixtures. The lengths of the long axis and the short axis of each optic 1015, along with the shape of each optic 1015, may be designed to produce a substantially rotationally symmetric light distribution as discussed above with reference to the lighting apparatus 700 shown in FIGS. 7A and 7B. Further, the spacing between the first light fixture 1050a and the second light fixture 1050b may be selected to optimize the uniformity and symmetry of the light distribution.

Figure 11B:
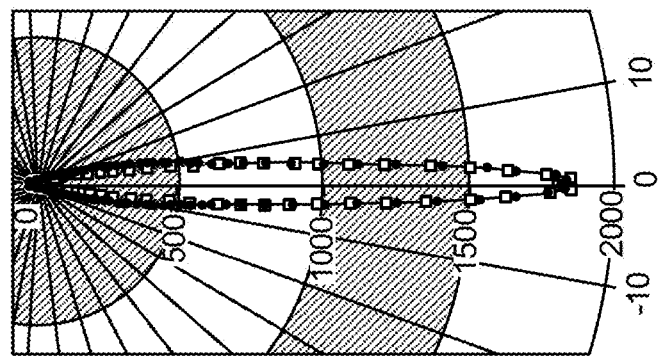
FIGS. 11A and 11B are graphs illustrating simulations of a light distribution from the lighting apparatus shown in FIG. 10.
Figure 11A:
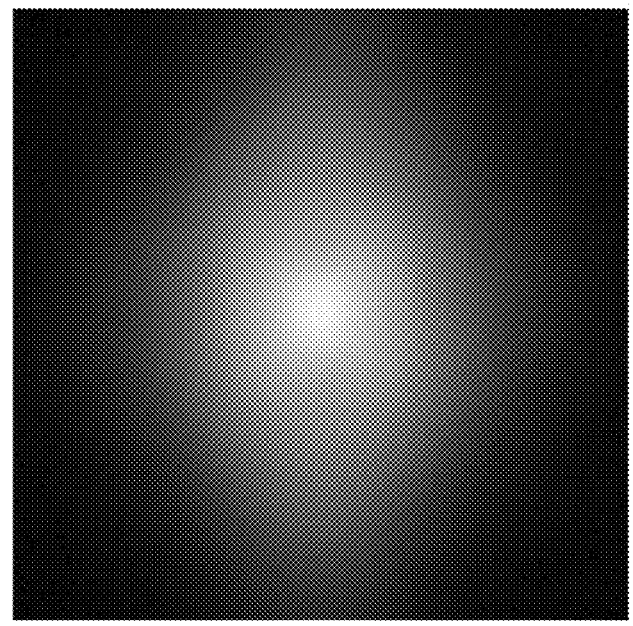

FIGS. 11A and 11B are graphs illustrating simulations of a light distribution from the lighting apparatus 1000. FIG. 11A shows a simulated true color plot 1100 of the light distribution from the lighting apparatus 1000 on an 8' by 8' floor from a height of 10', and FIG. 11B shows a simulated polar intensity plot 1105 of the light distribution from the lighting apparatus 1000. In this example, each light source may provide an equal light intensity. As shown in FIGS. 11A and 11B, the lighting apparatus 1000 provides a light distribution that has a peak in the center and is substantially rotationally symmetric. In this example, the light distribution has a FWHM of 9.3° in the X direction and 8.9° in the Y direction. There is minimal variation in the color of the light throughout the entire light distribution.

Figure 12B:
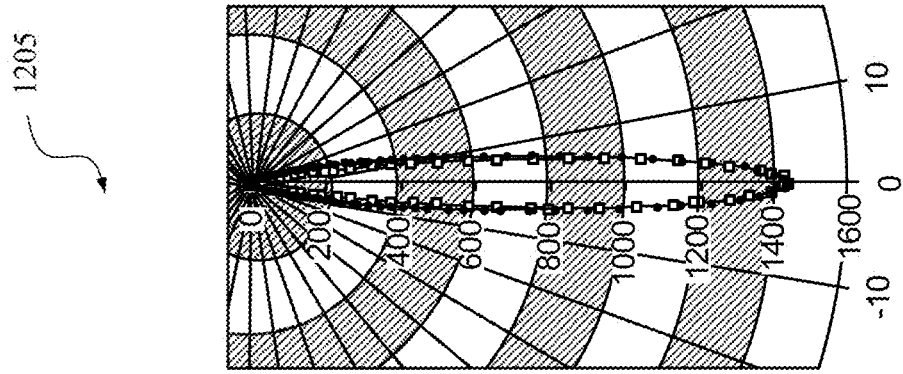
FIGS. 12A and 12B are graphs illustrating simulations of another light distribution from the lighting apparatus shown in FIG. 10 with additional light mixing.
Figure 12A:
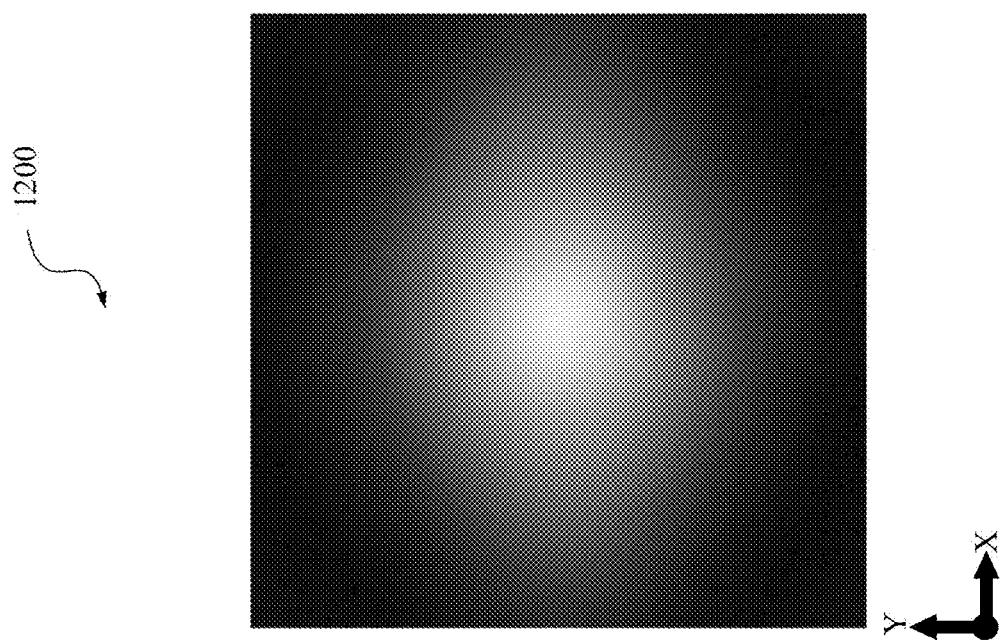

FIGS. 12A and 12B are graphs illustrating simulations of another light distribution from the lighting apparatus 1000 with additional light mixing. Specifically, a texture is provided to receive light from the light emitting surface 1025 of each optic 1015 and may function as a diffuser of the light. For example, the texture may be a secondary optical component having a molded structure and/or an optical pattern that is arranged to receive light from the light emitting surface 1025 of the optic 1015. Alternatively or in addition, the texture may be incorporated within a film that is arranged on the light emitting surface 1025 of the optic 1015, and/or molded directly into the light emitting surface 1025 of the optic 1015. The amount of scattering may be adjusted by changing various properties of the texture, such as the number of scratches or the depth and width of optical elements within the texture. FIG. 12A shows a simulated true color plot 1200 of the light distribution from the lighting apparatus 1000 with the texture on an 8' by 8' floor from a height of 10', and FIG. 12B shows a simulated polar intensity plot 1205 of the light distribution from the lighting apparatus 1000 with the texture. In this example, each light source may provide an equal light intensity. As shown in FIGS. 12A and 12B, the lighting apparatus 1000 with the texture provides a light distribution that has a peak in the center and is substantially rotationally symmetric. In this example, the light distribution has a FWHM of 11.4° in the X direction and 10.3° in the Y direction. There is minimal variation in the color of the light throughout the entire light distribution.

Figure 13:
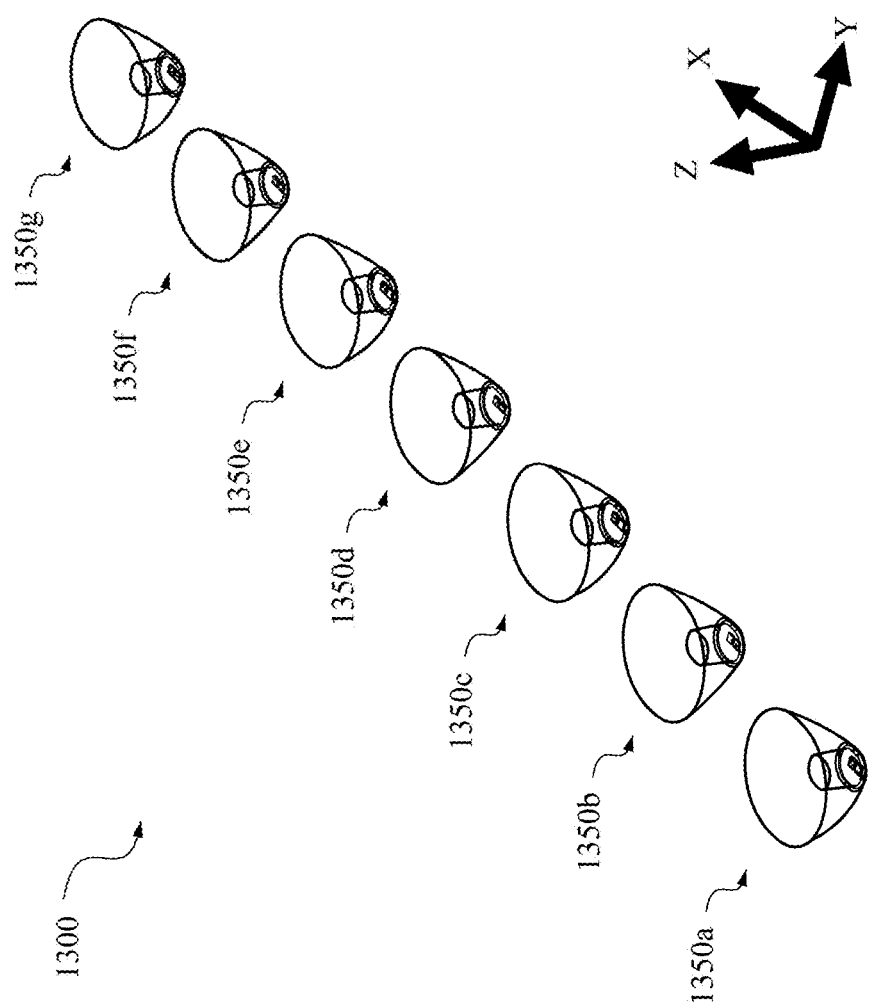
FIG. 13 is a schematic diagram of an example of a lighting apparatus that includes a plurality of light fixtures for a linear light distribution according to certain embodiments.

FIG. 13 is a schematic diagram of an example of a lighting apparatus 1300 that includes a plurality of light fixtures for a linear light distribution according to certain embodiments. Each of the plurality of light fixtures may be an example of the lighting apparatus 700 discussed above with reference to FIGS. 7A and 7B. In particular, each of the plurality of light fixtures may include two light sources that share a corresponding oblong optic. FIG. 13 shows a perspective view of the lighting apparatus 1300. As shown in FIG. 13, the lighting apparatus 1300 includes a plurality of light fixtures 1350a-1350g, each of which may have the same design as the lighting apparatus 700. Each of the plurality of light fixtures 1350a-1350g includes a first light source that has a first CCT and a second light source that has a second CCT. Further, each of the plurality of light fixtures 1350a-1350g includes an optic that has an oblong shape, such that a long axis of the optic along the X direction is longer than a short axis of the optic along the Y direction.

As shown in FIG. 13, the plurality of light fixtures 1350a-1350g may be arranged along the X direction in a manner that repeats a mirror reflection about the Y-Z plane. In particular, a first light fixture 1350a and a second light fixture 1350b may be arranged such that the second light source within the first light fixture 1350a (which has the second CCT) is adjacent to the second light source within the second light fixture 1350b (which also has the second CCT). A third light fixture 1350c may then be arranged such that the first light source within the third light fixture 1350c (which has the first CCT) is adjacent to the first light source within the second light fixture 1350b (which also has the first CCT). This extends the pattern within the lighting apparatus 1000 discussed above with reference to FIG. 10. Although seven light fixtures 1350a-1350g are shown in FIG. 13, any suitable number of light fixtures may be used. As shown in FIG. 13, the pattern repeats along the X direction and may produce a linear light distribution having an increased light output.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, systems, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing various embodiments. Various changes may be made in the function and arrangement of elements without departing from the spirit and scope of the present disclosure.

Terms, "and" and "or" as used herein, may include a variety of meanings that are also expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AC, BC, AA, ABC, AAB, AABBCCC, etc.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A lighting apparatus comprising:
a first light source and a second light source that are arranged along a linear direction; and
a total internal reflector (TIR) optic that is configured to receive light from the first light source and the second light source, the TIR optic comprising an optical axis, wherein:
the TIR optic has an oblong shape with a long axis that is parallel to the linear direction,
the first light source and the second light source are arranged at equal distances on opposite sides of the optical axis,
the first light source and the second light source are aligned with a base and an interior refractive surface of the TIR optic,
the first light source emits light in a first correlated color temperature (CCT) and the second light source emits light in a second CCT that is different than the first CCT, and
the TIR optic is configured to emit an output light beam that is substantially rotationally symmetric in a plane that is orthogonal to an emission direction of the first light source and the second light source.

2. The lighting apparatus of claim 1, wherein the first CCT is between 1800 K and 3500 K and the second CCT is between 4500 and 7000 K.

3. The lighting apparatus of claim 2, wherein the first CCT is 2700 K and the second CCT is 5000 K.

4. The lighting apparatus of claim 2, wherein a center of the TIR optic is aligned with an axis that runs between the first light source and the second light source.

5. The lighting apparatus of claim 1, further comprising a texture that is arranged to receive light from a light emitting surface of the TIR optic.

6. The lighting apparatus of claim 5, wherein the texture comprises at least one of a molded structure or an optical pattern.

7. The lighting apparatus of claim 1, wherein:
the output light beam has a first full-width at half-maximum (FWHM) along the linear direction and a second FWHM along a lateral direction that is orthogonal to the linear direction and to the emission direction of the first light source and the second light source, and
the first FWHM is within ±10% of the second FWHM.

8. The lighting apparatus of claim 1, wherein each of the first light source and the second light source has a geometry that is rotationally symmetric within a plane comprising the linear direction and a lateral direction that is orthogonal to the linear direction and to the emission direction of the first light source and the second light source.

9. A lighting apparatus comprising:
a first light fixture comprising:
a first light source having a first correlated color temperature (CCT);
a second light source having a second CCT, wherein the second CCT is different from the first CCT; and
a first TIR optic that is configured to receive first light from the first light source and the second light source and to emit a first output beam, the first TIR optic comprising a first optical axis, wherein:
the first TIR optic has a first oblong shape with a first long axis that is parallel to a linear direction,
the first light source and the second light source are arranged at equal distances on opposite sides of the first optical axis, and
the first light source and the second light source are aligned with a first base and a first interior refractive surface of the first TIR optic; and
a second light fixture comprising:
a third light source having the first CCT;
a fourth light source having the second CCT; and
a second TIR optic that is configured to receive second light from the third light source and the fourth light source and to emit a second output beam, wherein the second TIR optic has a second oblong shape with a second long axis that is parallel to the linear direction the second TIR optic comprising a second optical axis, wherein:
the third light source and the fourth light source are arranged at equal distances on opposite sides of the first optical axis,
the third light source and the fourth light source are aligned with a second base and a second interior refractive surface of the second TIR optic, and
the first light source, the second light source, the fourth light source, and the third light source are arranged in order along the linear direction.

10. The lighting apparatus of claim 9, wherein the first TIR optic and the second TIR optic are configured such that the first output beam and the second output beam combine to form an output light beam that is substantially rotationally symmetric in a plane that is orthogonal to an emission direction of the first light source, the second light source, the third light source, and the fourth light source.

11. The lighting apparatus of claim 10, wherein:
the output light beam has a first full-width at half-maximum (FWHM) along the linear direction and a second FWHM along a lateral direction that is orthogonal to the linear direction and to the emission direction of the first light source, the second light source, the third light source, and the fourth light source, and
the first FWHM is within ±10% of the second FWHM.

12. The lighting apparatus of claim 9, wherein the first CCT is between 1800 K and 3500 K, and the second CCT is between 4500 and 7000 K.

13. The lighting apparatus of claim 12, wherein the first CCT is 2700 K and the second CCT is 5000 K.

14. The lighting apparatus of claim 9, wherein a first center of the first TIR optic is aligned with a first axis that runs between the first light source and the second light source, and a second center of the second TIR optic is aligned with a second axis that runs between the third light source and the fourth light source.

15. The lighting apparatus of claim 9, further comprising a first texture that is arranged to receive light from a first light emitting surface of the first TIR optic and a second texture that is arranged to receive light from a second light emitting surface of the second TIR optic.

16. The lighting apparatus of claim 9, wherein the first texture comprises at least one of a first molded structure or a first optical pattern, and the second texture comprises at least one of a second molded structure or a second optical pattern.

17. The lighting apparatus of claim 9, wherein each of the first light source, the second light source, the third light source, and the fourth light source has a geometry that is rotationally symmetric within a plane comprising the linear direction and a lateral direction that is orthogonal to the linear direction and to an emission direction of the first light source, the second light source, the third light source, and the fourth light source.

* * * * *